(12) United States Patent
Yamaga et al.

(10) Patent No.: US 6,634,275 B2
(45) Date of Patent: Oct. 21, 2003

(54) AUTOMATIC BRAKE BOOSTER

(75) Inventors: Hiroyuki Yamaga, Saitama-Ken (JP); Hidefumi Inoue, Saitama-Ken (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 0 days.

(21) Appl. No.: 09/998,798

(22) Filed: Nov. 15, 2001

(65) Prior Publication Data
US 2002/0062731 A1 May 30, 2002

(30) Foreign Application Priority Data
Nov. 29, 2000 (JP) .................................. 2000-362923
Jul. 23, 2001 (JP) .................................. 2001-222138

(51) Int. Cl.⁷ .......................... B60T 13/00; F15B 13/16
(52) U.S. Cl. ................................................ 91/367
(58) Field of Search .............................. 91/367, 376 R (56) References Cited
U.S. PATENT DOCUMENTS
5,857,399 A  1/1999  Tsubouchi et al.
6,082,241 A * 7/2000  Kobayashi et al. ........... 91/367
6,170,382 B1 * 1/2001  Tsubouchi et al. ........... 91/367

* cited by examiner

Primary Examiner—Edward K. Look
Assistant Examiner—Thomas E. Lazo
(74) Attorney, Agent, or Firm—Flynn, Thiel, Boutell & Tanis, P.C.

(57) ABSTRACT

An automatic brake booster 1 includes a solenoid 8 which causes a back- and forth movement of a solenoid plunger 31 to switch a valve mechanism 6. A second vacuum valve seat member 11 including a second vacuum valve seat 12 which is juxtaposed with a first vacuum valve seat 10 on a valve body 3 and a pressure responsive area 34 subject to a pressure of a variable pressure chamber and a pressure of a constant pressure chamber is slidably mounted on the valve body. The effect of the pressure differential acting upon the pressure responsive area is balanced with the force resulting from the excitation of the solenoid plunger 31 to deliver a brake output which corresponds to the force. The invention enables a high accuracy control of a brake output during an automatic brake operation.

6 Claims, 4 Drawing Sheets

AUTOMATIC BRAKE BOOSTER

FIELD OF THE INVENTION

The present invention relates to an automatic brake booster which is used in a brake of an automobile or the like, and more particularly, to an improvement of the valve mechanism thereof.

DESCRIPTION OF THE PRIOR ART

An automatic brake booster is known in the art which comprises a valve body slidably disposed within a shell, a power piston mounted on the valve body to partition the interior of the shell into a constant pressure chamber and a variable pressure chamber, a valve mechanism for supplying a fluid to or displacing it from the variable pressure chamber, an input shaft for switching the valve mechanism, and a solenoid which drives a solenoid plunger slidably mounted on the valve body back and forth to switch the valve mechanism, the valve mechanism including a first vacuum valve seat formed on the valve body, an atmosphere valve seat formed on the valve plunger which is coupled to the input shaft, and a valve element which becomes seated on the first vacuum valve seat and the atmosphere valve seat from the rear side, the valve element becoming seated upon the first vacuum valve seat and being removed from the atmosphere valve seat as the valve plunger is driven forward and becoming seated upon the atmosphere valve seat and being removed from the first vacuum valve seat as the valve plunger is driven backward.

In an automatic brake booster of the kind described, an output from the power piston is transmitted through an output shaft to an piston of a master cylinder in order to generate a master cylinder liquid pressure. Part of the output is transmitted as a reaction to the valve plunger or the solenoid plunger through a reaction disc. When the input shaft is operated, the valve mechanism is operated in a manner such that the reaction from the reaction disc is balanced with the input from the input shaft. Alternatively, when the solenoid is energized, the valve mechanism is operated such that the excitation by the energized solenoid is balanced with the reaction from the reaction disc. In this manner, a brake output is delivered in accordance with an input from the input shaft or an excitation of the energized solenoid.

However, when an arrangement is employed in which a brake reaction is transmitted to the solenoid plunger, as a brake output is delivered by energizing the solenoid, a transmission path becomes complicated for the solenoid plunger to be operated once and the reaction therefrom be transmitted to the solenoid plunger, resulting in a large variation in the magnitude of reaction which is transmitted to the solenoid plunger and leading to instability of the reaction. In addition, a time lag occurs for the transmission of the reaction to the solenoid plunger. This makes it difficult to achieve a precise control by controlling the current or voltage applied to the solenoid in order to control the brake output.

SUMMARY OF THE INVENTION

In view of the foregoing, it is an object of the invention to provide an automatic brake booster which is capable of controlling a brake output when operating as an automatic brake with a high accuracy as compared with a conventional automatic brake booster.

Specifically, in an automatic brake booster including a valve body slidably disposed in a shell, a power piston mounted on the valve body and partitioning the interior of the shell into a constant pressure chamber and a variable pressure chamber, a valve mechanism mounted in the valve body for supplying a fluid to or discharging it from the variable pressure chamber, an input shaft for operating the valve mechanism, and a solenoid for driving a solenoid plunger which is slidably mounted on the valve body back and forth to operate the valve mechanism, the valve mechanism including a first vacuum valve seat formed on the valve body, an atmosphere valve seat formed on a valve plunger which is coupled to the input shaft, and a valve element which can be seated upon the first vacuum valve seat and the atmosphere valve seat, in accordance with the present invention, there is provided a second vacuum valve seat member slidably mounted on the valve body and having a second vacuum valve seat which is juxtaposed with the first vacuum valve seat and on which the valve element can be seated and a pressure responsive area which is subject to a pressure in the variable pressure chamber and a pressure in the constant pressure chamber, the arrangement being such that when the solenoid is energized, the solenoid plunger urges the second vacuum valve seat member against the valve element to switch the valve mechanism so that the acting force which results from a pressure differential between the pressure in the variable pressure chamber and the pressure in the constant pressure chamber and acting upon the pressure responsive area of the second vacuum valve seat member is balanced with the force with which the solenoid plunger is urged, thereby allowing a brake output which depends on the force with which the solenoid plunger is urged to be delivered.

Also, in an automatic brake booster including a valve body slidably disposed in a shell, a power piston mounted on the valve body and partitioning the interior of the shell into a constant pressure chamber and a variable pressure chamber, a valve mechanism mounted in the valve body for supplying a fluid to or discharging it from the variable pressure chamber, an input shaft for operating the valve mechanism, and a solenoid for driving a solenoid plunger which is slidably mounted on the valve body back and forth to operate the valve mechanism, the valve mechanism including a vacuum valve seat formed on the valve body, an atmosphere valve seat formed on a valve plunger which is coupled to the input shaft, and a valve element which can be seated upon the vacuum valve seat and the atmosphere valve seat, in accordance with a second aspect of the invention, there is provided a tubular member slidably mounted on the valve body and having the vacuum valve seat formed thereon and having a pressure responsive area which is subject to a pressure in the variable pressure chamber and to a pressure in the constant pressure chamber, the arrangement being such that upon energization of the solenoid, the solenoid plunger urges the tubular member toward the valve element to switch the valve mechanism and the force with which the solenoid plunger urges the tubular member is balanced with a force acting on the pressure responsive area of the tubular member which results from a pressure differential between the variable pressure chamber and the constant pressure chamber, thereby delivering a brake output which depends on the urging force from the solenoid plunger.

With the arrangement of the invention as mentioned above, when the solenoid is energized to deliver a brake output, the acting force which results from the pressure differential between the pressure in the constant pressure chamber and the pressure in the variable pressure chamber acts as a reaction on the solenoid plunger, whereby the transmission path from the energization of the solenoid to the transmission of the reaction to the solenoid plunger is simplified, minimizing a variation in the reaction and avoiding a time lag in the transmission of the reaction. Consequently, a brake output when operating as an automatic brake can be controlled with a better accuracy as compared with a conventional automatic brake booster.

Above and other objects, features and advantages of the invention will become apparent from the following description of several embodiments thereof with reference to the attached drawings.

DETAILED DESCRIPTION OF THE EMBODIMENTS

Several embodiments of the present invention will now be described with reference to the drawings. Initially referring to FIG. 1, an automatic brake booster 1 includes a shell 2, in which a substantially tubular valve body 3 is slidably disposed. A power piston 4 is connected to the outer periphery of the valve body 3, and a diaphragm 5 is applied to the back surface of the power piston 4 to partition the interior of the shell 2 into a constant pressure chamber A1 and a variable pressure chamber B1.

Figure 1:
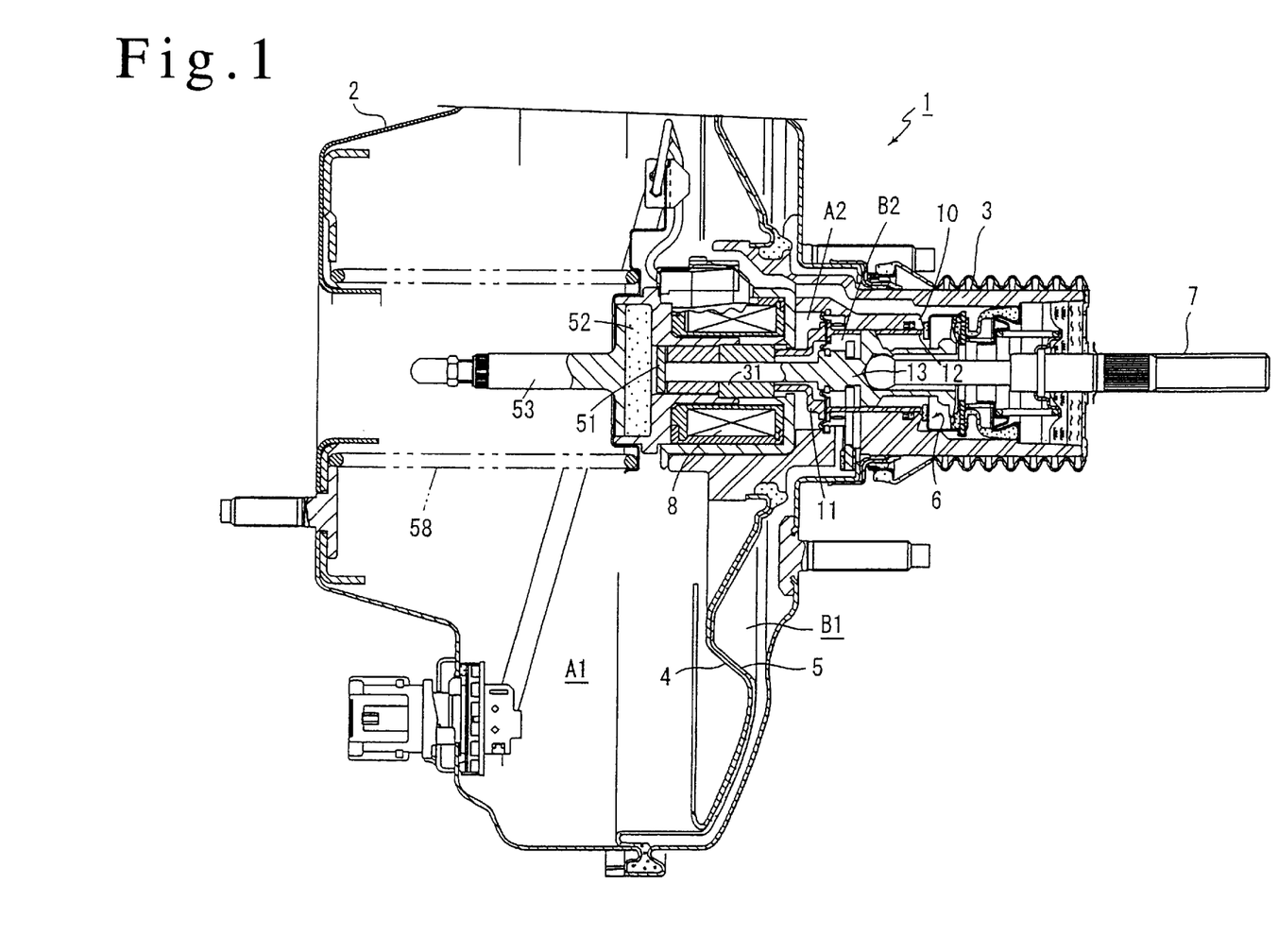
FIG. 1 is a cross section of an automatic brake booster 1 according to one embodiment of the present invention.

A valve mechanism 6 which supplies a fluid to or discharges it from the variable pressure chamber B1 is switchably controlled by an input shaft 7 connected to a brake pedal, not shown, and is also switchably controlled by a solenoid 8 which is controlled by a controller, not shown.

Figure 2:
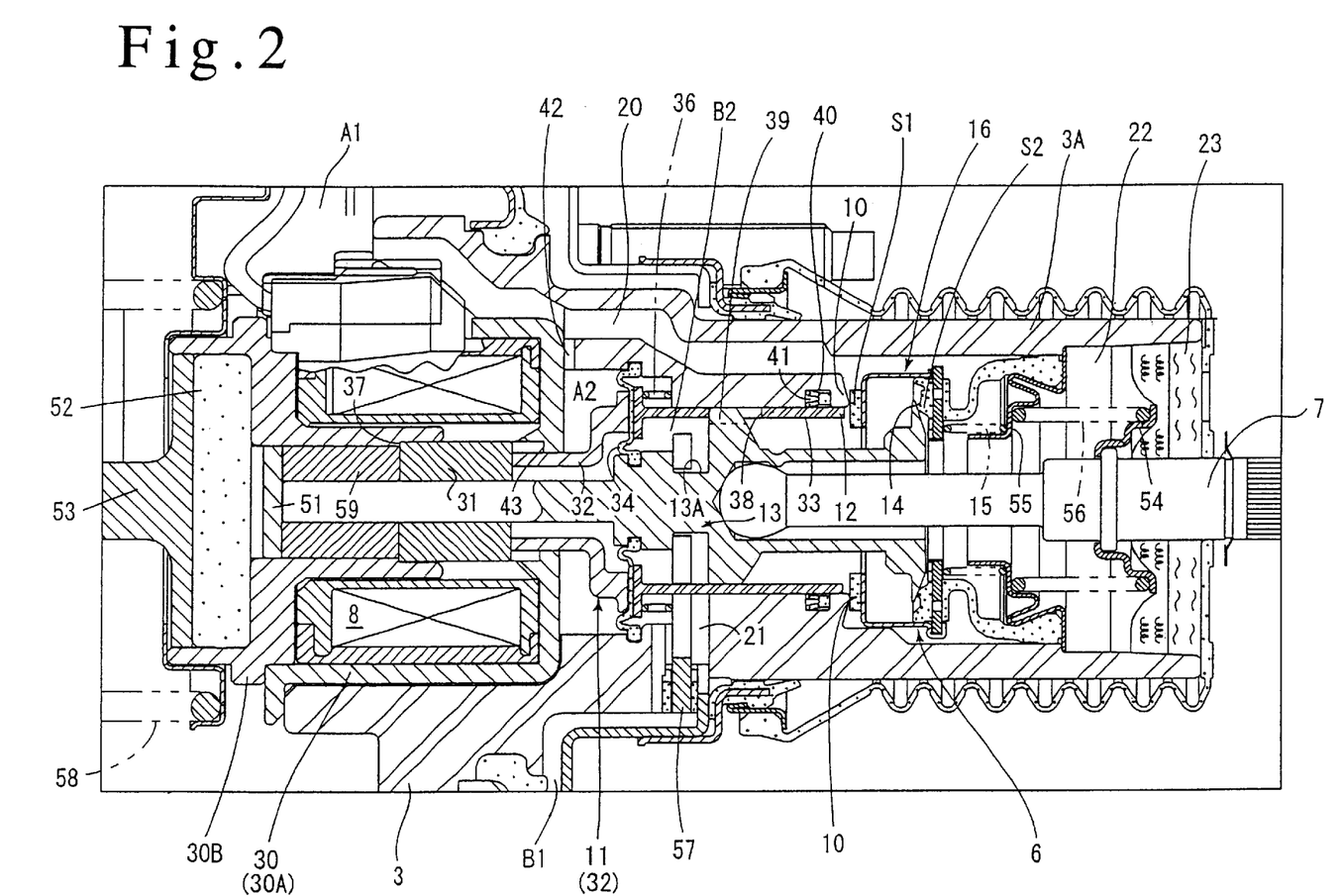
FIG. 2 is an enlarged view of part shown in FIG. 1.

The valve mechanism 6 is disposed within the valve body 3, and comprises, as shown in FIG. 2, an annular first vacuum valve seat 10 which is formed on the inner peripheral surface of the valve body 3 and facing rearward, an annular second vacuum valve seat 12 formed on a second vacuum valve seat member 11 which is slidably disposed within the valve body 3 radially inward of the first vacuum valve seat 10 and also facing rearward, an annular atmosphere valve seat 14 formed on a valve plunger 13 which is slidably disposed in the valve body 3 and facing rearward, and a tubular valve element 16 which is adapted to be seated on the first vacuum valve seat 10, the second vacuum valve seat 12 and the atmosphere valve seat 14 from the rear side under the resilience of a spring 15.

A space located radially outward of an annular seat area S1 on the valve element 16 where it contacts either the first vacuum valve seat 10 or the second vacuum valve seat 12 communicates with the constant pressure chamber A1 through an axial constant pressure passage 20 formed in the valve body 3. A space located radially between the seat area S1 and an annular seat area S2 on the valve element 16 where the latter contacts the atmosphere valve seat 14 communicates with the variable pressure chamber B1 through a radial variable pressure passage 21 formed in the valve body 3. A space located radially inward of the seat area S2 communicates with the atmosphere through a pressure passage 22 in a tubular end region 3A of the valve body 3. A filter 23 is disposed in the pressure passage 22. The constant pressure chamber A1 communicates with a source of negative pressure, not shown, through a negative pressure introducing tube (not shown) mounted on the shell 2, whereby the negative pressure is normally introduced into the constant pressure chamber A1.

A yoke 30 which is fitted into the valve body 3 supports a solenoid plunger 31 which is formed of a magnetizable material in a slidable manner, and the second valve seat member 11 comprises an engaging portion 32 which engages the solenoid plunger 31, a valve seat portion 33 located rearward of the engaging portion 32 and carrying the second vacuum valve seat 12 on its rear end, and a pressure responsive area 34 which is disposed between the engaging portion 32 and the valve seat portion 33. In the present embodiment, the solenoid plunger 31 is adapted to move rearward when the solenoid 8 is energized.

A spring 36 is disposed between the valve seat portion 33 and the valve body 3 to urge the second vacuum valve seat member 11 comprising the valve seat portion 33, the engaging potion 32 and the pressure responsive area 34 and the solenoid plunger 31 forwardly, thus maintaining the solenoid plunger 31 at its retracted end position shown where it abuts against a front step 37 formed on the inner peripheral surface of the yoke 30 when the solenoid 8 is deenergized. Under this condition, the second vacuum valve seat 12 is located slightly forward of the first vacuum valve seat 10.

At a given circumferential position, the valve seat portion 33 is formed with a slit 38, through which a projection 39 formed around the outer periphery of the valve plunger 13 extends, whereby a rear portion of the valve plunger 13 is supported by the valve body 3 in a slidable manner.

At a given location around the inner periphery, the valve body 3 is formed with a circumferentially extending annular groove 40, in which a seal member 41 is disposed to maintain a hermetic seal between the valve body 3 and the valve seat portion 33.

The pressure responsive area 34 represents a diaphragm formed by a thin film of an elastic material having an outer periphery portion of an increased thickness which is mounted on the valve body 3 in a hermetically sealed manner and an inner periphery portion which is also of an increased thickness and which is mounted on the valve plunger 13 in a hermetically sealed manner. In this manner, a constant pressure chamber A2 which communicates with the constant pressure chamber A1 through a radial communication path 42 formed in the valve body 3 is defined forwardly of the pressure responsive area 34 while a variable pressure chamber B2 which communicates with the variable pressure chamber B1 through the slit 38 and the pressure passage 21 is defined rearwardly of the pressure responsive area 34. The variable pressure chamber B2 is in effect part of the variable pressure passage 21.

The yoke 30 comprises an outer member 30A which is directly inserted into the inner periphery of the valve body 3 and an inner member 30B which is press fitted into the outer member 30A. The solenoid 8 is contained in a space defined between the outer member 30A and the inner member 30B. The front step 37 is formed on the inner periphery of the inner member 30B at its front end while a rear step 43 is formed on the inner periphery of the outer member 30A at its rear end so as to be abutted by the solenoid plunger 31 to restrict its movement. In this manner, the solenoid plunger 31 can move back and forth within an extent defined by the steps 37 and 43.

The rear end of the valve plunger 13 which has the atmosphere valve seat 14 thereon is pivotably connected with the front end of the input shaft 7 which is connected to a brake pedal in a rockable manner, thus allowing the valve plunger to be driven back and forth through the input shaft 7 when the brake pedal is operated.

A reaction plunger 51 and a reaction disc 52 which are fitted into the inner member 30B are sequentially disposed forwardly of the valve plunger 13, and the left end face of the reaction disc 52 is disposed in abutment against one end of an output shaft 53. This end of the output shaft 53 is received within the inner member 30B, while the other end of the output shaft projects externally through an axial portion of the shell 2 with a seal member, not shown, interposed therebetween, for engagement with the piston of a master cylinder, not shown.

A poppet return spring 56 is disposed between a plate 54 mounted on the input shaft 7 and a plate 55 mounted inside the valve body 3 for urging the input shaft 7 and its connected valve plunger 13 rearward. The valve plunger 13 is prevented from being withdrawn from within the valve body 3 by a key member 57. While not shown, the key member 57 has a forked end, as is well known in the art, and the key member 57 is inserted into the variable pressure passage 21 in the valve body 3 so that its end is engaged with a reduced diameter portion 13A which is formed by notching the outer periphery of the valve plunger 13.

It is to be noted that the key member 57 is displaceable in the variable pressure passage 21 in the axial direction of the valve body 3, and the key member 57 and the valve plunger 13 are displaceable in the axial direction of the valve body 3 within the extent limited by the axial length of the reduced diameter portion 13A. By disposing the key member 57 in abutment against the inner surface of the shell 2 to maintain the key member 57 and the valve plunger 13 at advanced positions relative to the valve body 3 when the automatic brake booster 1 is inoperative, a lost motion of the input shaft 7 which would occur at the commencement of operation of the automatic brake booster 1 is reduced.

A return spring 58 is disposed between the front wall of the shell 2 and the valve body 3 for normally maintaining the valve body 3 in its inoperative position shown (see FIG. 1).

It will be seen that the valve plunger 13 is urged forwardly as a result of a pressure differential acting upon itself and part of a pressure differential between the constant pressure chamber A2 and the variable pressure chamber B2 which acts upon the pressure responsive area 34 upon actuation, and accordingly, in the present embodiment, the poppet return spring 56 is charged to a load which is greater than the sum of both pressure differentials.

A tubular support member 59 is disposed inside the inner member 30B for slidably supporting a front portion of the valve plunger 13.

With the described arrangement, in the inoperative condition shown, the controller mentioned above maintains the solenoid 8 in a deenergized state, and accordingly, the second vacuum valve seat member 11 and the solenoid plunger 31 are maintained in their inoperative positions shown, whereby the second vacuum valve seat 12 which is formed thereon is located forwardly of the first vacuum valve seat 10.

On the other hand, a retracting movement of the key member 57 is limited by its abutment against the shell 2, and a retracting movement of the valve body 3 is limited by its abutment against the key member 57. Under this condition, the valve element 16 is seated on the atmosphere valve seat 14 which forms the valve mechanism 6, thus interrupting the communication of the variable pressure chambers B1 and B2 with the atmosphere, while the valve element 16 is removed from the first vacuum valve seat 10 and the second vacuum valve seat 12 to allow a communication between the constant pressure chamber A1 and the variable pressure chambers B1 and B2. Accordingly, the constant pressure chamber A1 and the variable pressure chamber B1 located across the power piston 4 assume an equal pressure, as do the constant pressure chamber A2 and the variable pressure chamber B2 across the pressure responsive area 34.

If a brake pedal is depressed under this inoperative condition, the input shaft 7 and the valve plunger 13 are driven forward relative to the valve body 3, and the valve element 16 which is driven forward integrally while it is seated on the atmosphere valve seat 14 on the valve plunger 13 becomes seated upon the first vacuum valve seat 10 to interrupt the communication between the constant pressure chamber A1 and the variable pressure chamber B1, and as the valve plunger 13 is driven further forward, the valve element 16 is removed from the atmosphere valve seat 14 to allow the variable pressure chamber B1 to communicate with the atmosphere.

Accordingly, a pressure differential is developed between the constant pressure chamber A1 and the variable pressure chamber B1 located across the power piston 4, and an output from the power piston 4 which results from this pressure differential is transmitted through the output shaft 53 to the piston of a master cylinder, not shown, thus generating a master cylinder liquid pressure.

Part of the output which is transmitted to the output shaft 53 is transmitted, as a reaction, to the valve plunger 13 through the reaction piston 52 and the reaction plunger 51, and the output is controlled so that a balance is reached between the reaction and the input applied to the input shaft 7. When the balance is reached, the valve element 16 is seated upon the first vacuum valve seat 10 on the valve body 3 and is also seated on the atmosphere valve seat 14 on the valve plunger 13 to achieve a servo balance condition.

When the brake pedal is released under the servo balance condition, the valve plunger 13 retracts together with the input shaft 7 relative to the valve body 3 under the resilience of the poppet return spring 56 which overcomes the effects of both pressure differentials, whereby the valve element 16 is removed from the first vacuum valve seat 10, allowing the variable pressure chambers B1 and B2 to communicate with the constant pressure chamber A1 again. In this manner, the atmosphere which has been introduced into the variable pressure chambers B1 and B2 is allowed to find its way into the constant pressure chamber A1, thus permitting the valve body 3 to retract to its inoperative position shown.

Alternatively, when the solenoid 8 is energized by the controller under the inoperative condition shown, the solenoid plunger 31 urges the second vacuum valve seat member 11 rearward, whereby the member 11 moves rearward relative to the valve body 3 and valve plunger 13 against the resilience of the spring 36. The valve element 16 is then seated on the second vacuum valve seat 12 on the second vacuum valve seat member 11 to interrupt a communication between the constant pressure chamber A1 and the variable pressure chambers B1 and B2. In addition, the second vacuum valve seat member 11 causes the valve element 16 to retract rearward, whereby the valve element 16 becomes removed from the atmosphere valve seat 14 on the valve plunger 13, thus causing the variable pressure chamber B1 to communicate with the atmosphere.

Accordingly, a pressure differential is developed between the constant pressure chamber A1 and the variable pressure chamber B1 disposed across the power piston 4, whereby the valve body 3 is driven forward to deliver a brake output.

The pressure which prevails in the variable pressure chamber B1 is supplied into the variable pressure chamber B2, and accordingly, the pressure in the constant pressure chamber A2 and the pressure in the variable pressure chamber B2 act on the pressure responsive area 34 of the second vacuum valve seat member 11, and the pressure differential acts on the second vacuum valve seat member 11 to urge it forwardly. The valve mechanism 6 is controlled so that a pressure is established in the variable pressure chamber B1 which achieves a balance between the urging force caused by the excitation of the solenoid plunger 31 and the effect of the pressure differential. The resilience of the spring 36 is also effective, but in effect has no influence upon the balance of the pressure responsive area 34 because a load to which the spring 36 is charged is low and the spring has a small spring constant.

In the present embodiment, the second vacuum valve seat member 11 and the solenoid plunger 31 are formed separately, but it should be understood that they may be constructed integrally. Alternatively, the pressure responsive area 34 may be formed on the solenoid plunger 31. Instead of forming the pressure responsive area 34 by a diaphragm, it may comprise a piston.

It will be understood from the foregoing description that with the automatic brake booster 1 of the present embodiment, the pressure differential between the constant pressure chamber A2 and the variable pressure chamber B2 which is developed in the pressure responsive area 34 is used as a reaction during the automatic brake operation. This eliminates a variation in the reaction, which can be stable. In addition, because the reaction is immediately acting upon the solenoid plunger 31 as soon as the valve mechanism 6 is switched, a brake output during the automatic brake operation can be controlled with a better accuracy as compared with the prior art practice where a brake reaction is partly transmitted through a complicated transmission path including a reaction disc or the like.

Since the second vacuum valve seat 12 is located forwardly of the first vacuum valve seat 10 when the solenoid 8 is deenergized, during a normal braking operation which takes place by operating the input shaft 7, there is no influence upon the operation of the second vacuum valve seat 12, allowing the operation to proceed in a similar manner as in the prior art.

Second Embodiment

Figure 3:
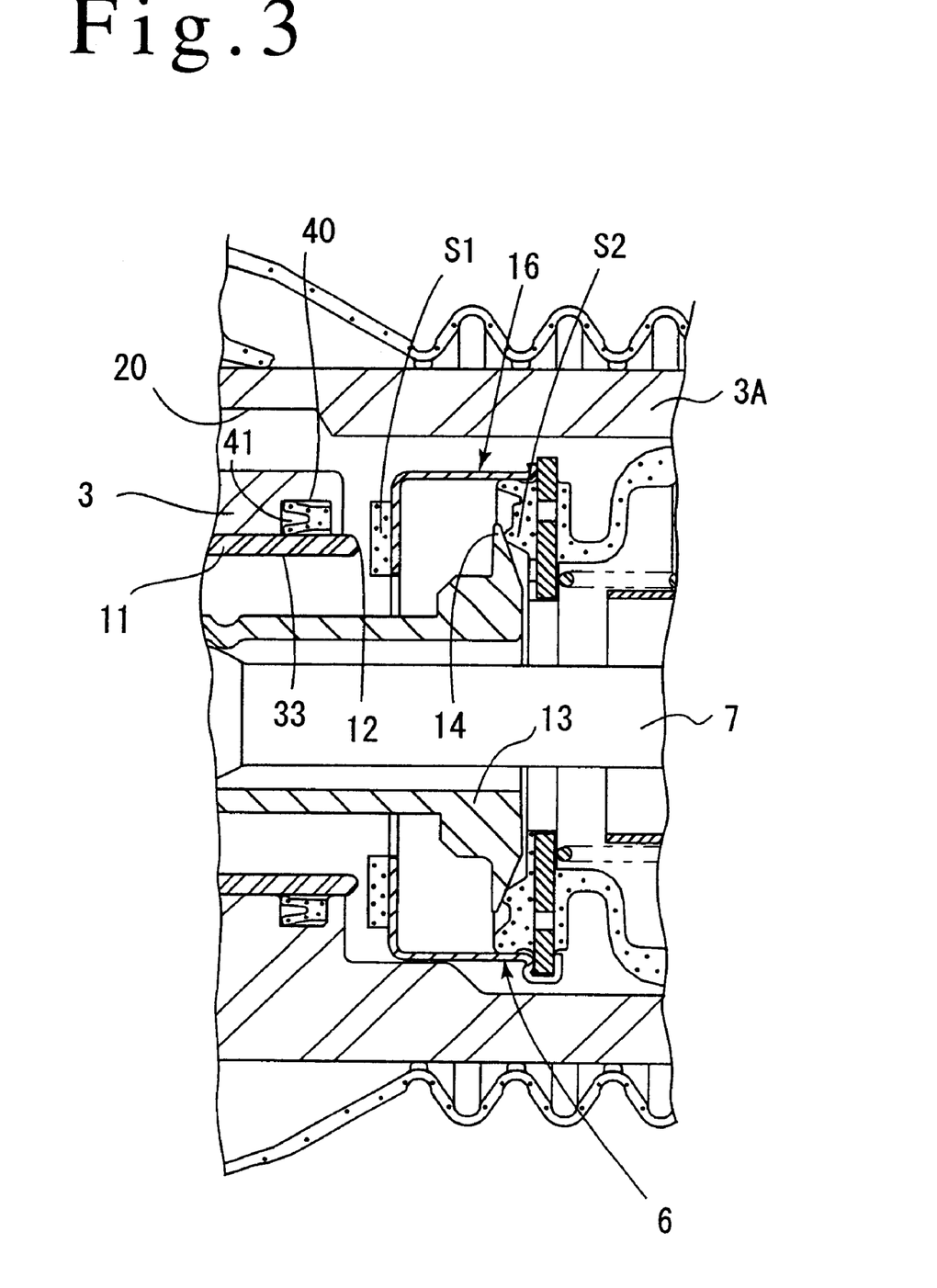
FIG. 3 is a cross section of an essential part of a second embodiment of the present invention.

A second embodiment may be contemplated to be constructed as follows: Specifically, as shown in FIG. 3, the first vacuum valve seat 10 shown in FIG. 1 may be eliminated, and a vacuum valve seat 12 may be defined on a rear end of the second vacuum valve seat member 11. The arrangement remains to be similar to the first embodiment in other respects.

In the second embodiment thus constructed, during a usual operation when the solenoid 8 is not energized, as the valve plunger 13 is driven forward, the valve element 16 becomes seated on the vacuum valve seat 12 on the second vacuum valve seat member 11 to interrupt a communication between the constant pressure chamber A1 and the variable pressure chamber B1. As the valve plunger 13 further advances, the valve element 16 moves away from the atmosphere valve seat 14 to allow the variable pressure chamber B1 to communicate with the atmosphere. Hence, a pressure differential across the piston 4 causes an output to be delivered through the output shaft 53 to actuate the piston of a master cylinder, not shown.

When the solenoid 8 is energized by a controller in the inoperative condition, the second vacuum valve seat member 11 moves relative to the valve body 3 such that the vacuum valve seat 12 is seated on the valve element 16 to interrupt the communication between the constant pressure chamber A1 and the variable pressure chambers B1 and B2. In addition, the second vacuum valve seat member 11 drives the valve element 16 rearward, causing the valve element 16 to move away from the atmosphere valve seat 14 to allow the variable pressure chamber B1 to communicate with the atmosphere. Accordingly, a pressure differential across the power piston 4 causes an output to be delivered through the output shaft 53 to drive the piston of a master cylinder, not shown.

This second embodiment is also capable of achieving a similar functioning and effects as in the first embodiment.

Third Embodiment

Figure 4:
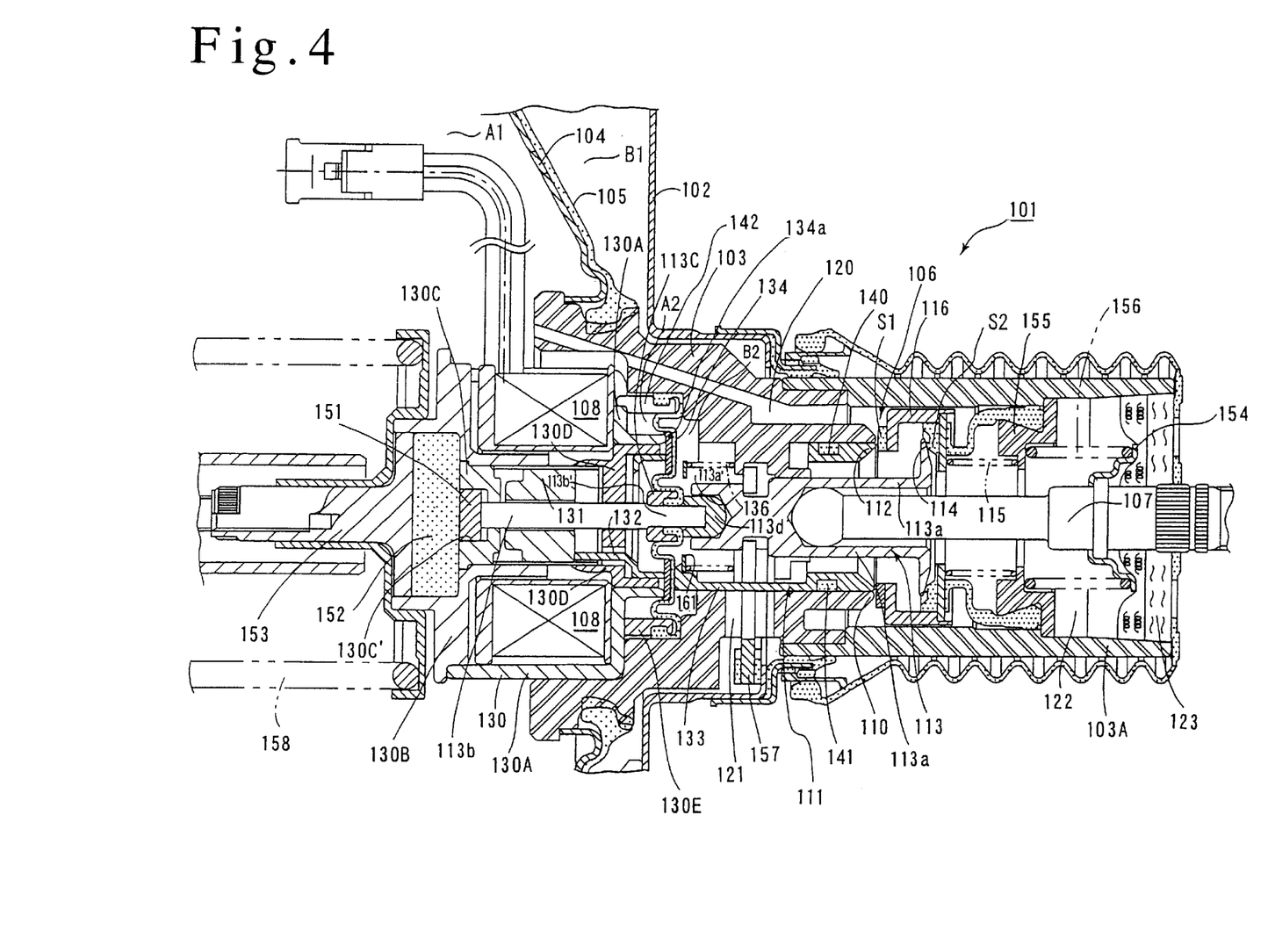
FIG. 4 is a cross section of an essential part of a third embodiment of the present invention.

FIG. 4 shows a third embodiment of the present invention where a valve plunger 113 comprises a plurality of members which are axially disposed and a second vacuum valve seat member 111 also comprises a plurality of members. Such an arrangement facilitates an assembly of the valve plunger 113 and a diaphragm 134 which forms the pressure responsive area within a valve body 103.

Specifically, the valve plunger 113 comprises a rearwardly located plunger member 113a, a forwardly located rod member 113b, and an annular member 113c and a connecting member 113d which are used to connect a diaphragm 134 to the rear end of the rod member 113b.

An atmosphere valve seat 114 is formed on the rear end face of the rear plunger member 113a, which is formed with a bottomed opening in which an input shaft 107 is fitted. Toward the front end, the plunger member 113a is formed with an annular groove around its outer periphery, which is engaged by a key member 157. A bottomed opening 113a' is formed in the front end face of the plunger member 113a, and has a conical bottom which is tapered in the rearward direction. The outer periphery of the plunger member 113a is slidably fitted into the inner periphery of a valve body 103, thus guiding the plunger member 113a for its back-and-forth movement.

Toward the rear end, the rod member 113b has a reduced diameter portion 113b', over which the annular member 113c is fitted from the rear side. In this manner, an annular space is formed between the inner periphery of the annular member 113c and the outer periphery of the reduced diameter portion 113b, and the inner periphery of the diaphragm 134 is inserted into the annular space from the rear side. The connecting member 113d which is cup-shaped is fitted over the end of the reduced diameter portion 113b' from the rear side until the front end of the connecting member 113d abuts against the diaphragm 134, thus holding the diaphragm portion sandwiched between both members 113c and 113d. In this manner, the inner periphery of the diaphragm 134 is secured to the outer periphery of the rod member 113b while maintaining a hermetic seal.

The rear end of the connecting member 113d has a semi-spherical configuration, which is fitted into the bottomed opening formed in the plunger member 113a until it abuts against the bottom thereof. In this manner, the rod member 113b, the connecting member 113d and the plunger member 113a are connected in an integral manner. If the axes of the plunger member 113a and the rod member 113b are misaligned, such misalignment can be tolerated.

In the third embodiment, a stepped tubular guide 130D is fitted into the inner periphery of an outer member 130A toward the rear end thereof, and a stepped tubular guide member 130C is fitted into the inner periphery of an inner member 130B. Toward the front end, the outer periphery of a solenoid plunger 131 is slidably fitted into the inner periphery of the inner member 130B while toward the rear end, the outer periphery of the solenoid plunger 131 is slidably fitted into the inner periphery of the tubular guide 130D.

The guide member 130C, which is located forwardly, is formed with a circular recess 130C' in its front end face for receiving a reaction plunger 151 therein in a reciprocable manner.

The rod member 113b of the valve plunger 113 extends through the tubular guide 130D, the solenoid plunger 151 and the guide member 130C, and has a front end face which is disposed in abutment against the rear end face of the reaction plunger 151. In this manner, the back-and-forth movement of the rod member 113b is guided by the tubular guide 130D and the guide member 130C.

Because the guide member 130C, which is located forwardly, is fitted inside the inner member 130b in the present embodiment, when a brake reaction acts upon a reaction disc 152, the brake reaction can be transmitted to an input shaft 107 through the reaction plunger 151 and the valve plunger 113. As a result of fitting the guide member 130c into the inner member 130b, the brake reaction cannot be transmitted from the reaction disc 152 to the solenoid plunger 131.

A second vacuum valve seat member 111 comprises a tubular valve seat portion 133 which is located rearwardly, a diaphragm 134 disposed forwardly thereof and acting as an pressure responsive area, a pressure responsive plate 134a applied to the diaphragm 134 and forming part of the pressure responsive area, and an engaging portion 132 which is disposed forwardly thereof.

The valve seat portion 133, which is located rearward, is slidably fitted into the inner periphery of the valve body 103 in a manner surrounding the plunger member 113a of the valve plunger 113. Toward the rear end, the outer periphery of the valve seat portion 133 is formed with an annular groove 140 in which an annular seal member 141 is mounted, thus maintaining a hermetic seal between the outer periphery of the valve seat portion 133 and the inner periphery of the valve body 103. A ring plate 161 is mounted on the inner periphery of the valve seat portion 133 toward the from end thereof, and a spring 136 is disposed between the ring plate 161 and its opposing stepped end face of the valve body 103, thus urging the valve seat portion 133 forwardly to cause the front end of the valve seat portion 133 to abut against the diaphragm 134 at a position where the pressure responsive plate 134a is applied and also urging the valve seat portion 133, the diaphragm 134 and the pressure responsive plate 134a forwardly.

The inner periphery of the diaphragm 134 is connected to the rod member 113b of the valve plunger 113 in the manner mentioned above, and the outer periphery of the diaphragm 134 is secured to the inner periphery of the valve body 103. More specifically, a portion of the diaphragm 134 which is located toward the outer periphery covers a rear end of a cylindrical member 130E, and the outer periphery of the diaphragm 134 is in turn engaged with an annular groove formed in the cylindrical member 130E. Under this condition, the outer periphery of the diaphragm 134 and the cylindrical member 130E are fitted into the inner periphery of the valve body 103 to be secured therein. The cylindrical member 130E is formed with a radial notch to provide a communication path 142. An internal space within the valve body 103 which is located forwardly of and adjacent to the diaphragm 134 defines a constant pressure chamber A2, which communicates with the other constant pressure chamber A1 through the communication path 142. An internal space within the valve body 103 which is located rearward of and adjacent to the diaphragm 134 defines a variable pressure chamber B2, which communicates with a variable pressure chamber B1 through a variable pressure passage 121.

The engaging portion 132 has a cylindrical rear portion, which is slidably fitted into the inner periphery of the tubular guide 130D, and has a rear end which is disposed in abutment against the pressure responsive plate 134a. The front end of the engaging portion 132 extends through the tubular guide 130D and abuts against the rear end face of the solenoid plunger 131.

The spring 136 causes the pressure responsive plate 134a to abut against the engaging portion 132 and causes the front end of the engaging member 132 to abut against the rear end face of the solenoid plunger 131. In other words, an arrangement is made so that the valve seat portion 133, the diaphragm 134, the pressure responsive plate 134a, the engaging portion 132 and the solenoid plunger 131 can be driven back and forth in an integral manner.

In the inoperative condition shown, the pressure responsive plate 134a abuts against the rear end of the outer member 130A, whereby the second vacuum valve seat member 111 and the solenoid plunger 131 remain stationary in their inoperative positions. By contrast, when the solenoid 108 is energized by a controller, the solenoid plunger 131 is driven rearward against the resilience of the spring 136, whereupon the second vacuum valve seat member 111 moves rearward relative to the valve body 103 in an integral manner with the solenoid plunger 131.

In other respects, the arrangement is substantially similar to the first embodiment, and accordingly, corresponding parts to those shown in the first embodiment are designated by like reference numerals as used before, to which 100 is added.

Operation of Third Embodiment

In the inoperative condition shown in FIG. 4, the solenoid 108 is not energized by the controller, and under this condition, the second vacuum valve seat member 111 and the solenoid plunger 131 are maintained in their inoperative positions shown, and the second vacuum valve seat 112 is located forwardly of the first vacuum valve seat 110.

On the other hand, the key member 157 is in abutment against the shell 102 and thus its retracting movement is limited. The valve body 103 abuts against the key member 157, and thus its retracting movement is also limited. Under this condition, the valve element 116 is seated on the atmosphere valve seat 114 which forms the valve mechanism 106 to interrupt a communication between the variable pressure chambers B1 and B2 with the atmosphere, and is removed from the first vacuum valve seat 110 and the second vacuum valve seat 112 to allow a communication between the constant pressure chamber A1 and the variable pressure chambers B1 and B2. Accordingly, the constant pressure chamber A1 and the variable pressure chamber B1 located across the power piston 104 assume an equal pressure as do the constant pressure chamber A2 and the variable pressure chamber B2 located across the diaphragm 134 which acts as the pressure responsive area.

If the brake pedal is now depressed, the input shaft 107 and the valve plunger 113 are driven forwardly relative to the valve body 103, and the valve element 116 which is driven forward integrally therewith while it is seated upon the atmosphere valve seat 114 on the valve plunger 113 becomes seated on the first vacuum valve seat 110 on the valve body 103 to interrupt the communication between the constant pressure chamber A1 and the variable pressure chamber B1, and as the valve plunger 113 is further driven forward, the valve element 116 is removed from the atmosphere valve seat 114 to allow the variable pressure chamber B1 to communicate with the atmosphere.

A pressure differential is then developed between the constant pressure chamber A1 and the variable pressure chamber B1 located across the power piston 104, and an output which results from the differential pressure applied across the power piston 104 is transmitted through an output shaft 153 to the piston of a master cylinder, not shown, thus generating a master cylinder liquid pressure.

Part of the output transmitted to the output shaft 153 is then transmitted as a reaction to the valve plunger 113 through the reaction disc 152 and the reaction plunger 151, and the output is controlled so that the reaction is balanced with an input applied to the input shaft 107. When the balance is reached, the valve element 116 becomes seated on the first vacuum valve seat 110 on the valve body 103 and is also seated on the atmosphere valve seat 114 on the valve plunger 113 to achieve a servo balance condition.

If the brake pedal is released under the servo balance condition, the resilience of the poppet return spring 156 causes the valve plunger 113 to retract together with the input shaft 107 relative to the valve body 103 while overcoming both pressure differentials, whereby the valve element 116 is removed from the first vacuum valve seat 110 to allow the variable pressure chambers B1 and B2 to communicate with the constant pressure chamber A1 again. The atmosphere which has been introduced into the variable pressure chambers B1 and B2 is then allowed to find its way into the constant pressure chamber A1, thereby allowing the valve body 103 to retract to its inoperative position shown.

Alternatively, when the solenoid 108 is energized by the controller under the inoperative condition shown, the solenoid plunger 131 urges the second vacuum valve seat member 111 rearward to move it rearward relative to the valve body 103 and the valve plunger 113 against the resilience of the spring 136. Accordingly, the valve element 116 is seated on the second vacuum valve seat 112 on the second vacuum valve seat member 111 to interrupt the communication between the constant pressure chamber A1 and the variable pressure chambers B1 and B2, and the second vacuum valve seat member 111 causes the valve element 116 to further retract rearward, whereby the valve element 116 is removed from the atmosphere valve seat 114 on the valve plunger 113, allowing the variable pressure chamber B1 to communicate with the atmosphere.

Accordingly, a pressure differential is developed between the constant pressure chamber A1 and the variable pressure chamber B1 located across the power piston 104, whereby the valve body 103 is driven forward to deliver a brake output.

Since the pressure which prevails in the variable pressure chamber B1 is supplied into the variable pressure chamber B2, the pressure in the constant pressure chamber A2 and the pressure in the variable pressure chamber B2 act on the diaphragm 134 and the pressure responsive plate 134a of the second vacuum valve seat member 111, which is therefore urged forwardly by the pressure differential. In this manner, the valve mechanism 6 is controlled so that the variable pressure chamber B1 obtains a pressure where the force resulting from the excitation of the solenoid plunger 131 is balanced with the effect of the pressure differential across the diaphragm 134. In this manner, the functioning and effect described above in connection with the first embodiment is similarly achieved in the third embodiment.

It is to be noted that in the third embodiment, the valve plunger 113 comprises a plurality of members, and the inner periphery of the diaphragm 134 is connected to the rod member 113b of the valve plunger 113, facilitating the assembly of the valve plunger 113 and the diaphragm 134 acting as the pressure responsive area into the valve body 103 in comparison to the first embodiment in which the valve plunger 13 comprises a single member. Since the second vacuum valve seat member 111 and the valve plunger 113 are related to each other through the diaphragm 134 alone, a smooth back-and-forth movement of the vacuum valve seat member 111 and the valve plunger 113 is assured.

As shown in the second embodiment shown in FIG. 3, the first vacuum valve seat 110 on the valve body 103 may be eliminated in the third embodiment, and a vacuum valve seat 12 may be defined only on the rear end of the second vacuum valve seat member 111. Even such an arrangement is capable of achieving a similar functioning and effects as in the third embodiment.

While the invention has been described above in connection with several embodiments thereof, it should be understood that a number of changes, modifications and substitutions therein are possible from the above disclosure without departing from the spirit and scope of the invention defined by the appended clams.

What is claimed is:

1. An automatic brake booster comprising:
   a valve body slidably disposed within a shell;
   a power piston mounted on the valve body for partitioning the interior of the shell into a constant pressure chamber and a variable pressure chamber;
   a valve mechanism mounted on the valve body for supplying a fluid to or discharging a fluid from the variable pressure chamber, the valve mechanism including a first vacuum valve seat formed on the valve body, an atmosphere valve seat formed on a valve plunger which is coupled to an input shaft for operating the valve mechanism and a valve element which can be seated upon the first vacuum valve seat and the atmosphere valve seat;
   the input shaft for operating the valve mechanism; and
   a solenoid for causing back-and-forth movement of a solenoid plunger which is slidably mounted in the valve body to operate the valve mechanism;
   characterized by the provision of a second vacuum valve seat member slidably mounted on the valve body and including a second vacuum valve seat which is juxtaposed with the first vacuum valve seat and on which the valve element can be seated and a pressure responsive area which is subject to a pressure in the variable pressure chamber and a pressure in the constant pressure chamber, the pressure responsive area including a diaphragm having an outer periphery secured to the valve body and an inner periphery secured to the valve plunger, wherein upon energization of the solenoid, the solenoid plunger urges the tubular member towards the valve element to switch the valve mechanism and the force with which the solenoid plunger urges the tubular member is balanced with a force acting on the pressure responsive area of the tubular member which results from a pressure differential between the variable pressure chamber and the constant pressure chamber, thereby delivering a brake output which depends on the urging force from the solenoid plunger.

2. An automatic brake booster according to claim 1, wherein, in the inoperative position, the second vacuum valve seat is located forwardly of the first vacuum valve seat and, under this condition, the valve element can be seated only on the first vacuum valve seat.

3. An automatic brake booster comprising:

a valve body slidably disposed within a shell;

a power piston mounted on the valve body for partitioning the interior of the shell into a constant pressure chamber and a variable pressure chamber;

a valve mechanism mounted on the valve body for supplying a fluid to or discharging a fluid from the variable pressure chamber, the valve mechanism including a first vacuum valve seat formed on the valve body, an atmosphere valve seat formed on a valve plunger which is coupled to an input shaft for operating the valve mechanism and a valve element which can be seated upon the first vacuum valve seat and the atmosphere valve seat;

the input shaft for operating the valve mechanism; and a solenoid for causing back-and-forth movement of a solenoid plunger which is slidably mounted in the valve body to operate the valve mechanism;

characterized by the provision of a second vacuum valve member slidably mounted on the valve body and including a second vacuum valve seat which is juxtaposed with the first vacuum valve seat and on which the valve element can be seated and a pressure responsive area which is subject to a pressure in the variable pressure chamber and a pressure in the constant pressure chamber, the pressure responsive area including a diaphragm having an outer periphery secured to the valve body and an inner periphery secured to the valve plunger, the valve plunger comprising a first member connected to the input shaft and on which the atmosphere valve seat is formed and a second member disposed forwardly of the first member for transmitting a brake reaction from a reaction disc which is disposed between the valve body and an output shaft to the first member, the first member being disposed so that its back-and-forth movement is guided by an inner peripheral surface of the valve body and the second member being disposed so that its back-and-forth movement is guided by a guide member disposed within the valve body, and upon energization of the solenoid, the solenoid plunger urges the tubular member towards the valve element to switch the valve mechanism and the force with which the solenoid plunger urges the tubular member is balanced with a force acting on the pressure responsive area of the tubular member which results from a pressure differential between the variable pressure chamber and the constant pressure chamber, thereby delivering a brake output which depends on the urging force from the solenoid plunger.

4. An automatic brake booster comprising:

a valve body slidably disposed within a shell;

a power piston mounted on the valve body for partitioning the interior of the shell into a constant pressure chamber and a variable pressure chamber;

a valve mechanism mounted on the valve body for supplying a fluid to or discharging a fluid from the variable pressure chamber, the valve mechanism including a first vacuum valve seat formed on the valve body, an atmosphere valve seat formed on a valve plunger which is coupled to an input shaft for operating the valve mechanism and a valve element which can be seated upon the first vacuum valve seat and the atmosphere valve seat;

the input shaft for operating the valve mechanism; and a solenoid for causing back-and-forth movement of a solenoid plunger which is slidably mounted in the valve body to operate the valve mechanism;

characterized by the provision of a second vacuum valve member slidably mounted on the valve body and including a second vacuum valve seat which is juxtaposed with the first vacuum valve seat and on which the valve element can be seated and a pressure responsive area which is subject to a pressure in the variable pressure chamber and a pressure in the constant pressure chamber, the valve plunger comprising a first member connected to the input shaft and on which the atmosphere valve seat is formed and a second member disposed forwardly of the first member for transmitting a brake reaction from a reaction disc which is disposed between the valve body and an output shaft to the first member, the first member being disposed so that its back-and-forth movement is guided by an inner peripheral surface of the valve body and the second member being disposed so that its back-and-forth movement is guided by a guide member disposed within the valve body, the second vacuum valve seat member being guided along the inner peripheral surface of the valve body and comprising a valve seat area on which the second vacuum valve seat is formed and an engaging portion which transmits the force from the solenoid plunger to the pressure responsive area, a resilient member being disposed between the valve body and the valve seat area to urge the valve seat area against the pressure responsive area, and upon energization of the solenoid, the solenoid plunger urges the tubular member towards the valve element to switch the valve mechanism and the force with which the solenoid plunger urges the tubular member is balanced with a force acting on the pressure responsive area of the tubular membrane which results from a pressure differential between the variable pressure chamber and the constant pressure chamber, thereby delivering a brake output which depends on the urging force from the solenoid plunger.

5. An automatic brake booster according to claim 4, wherein the pressure responsive area comprises a diaphragm which is formed from an elastic material and has an outer periphery which is secured to the inner periphery of the valve body and an inner periphery which is secured to the second member.

6. An automatic brake booster comprising a valve body slidably disposed in a shell;

a power piston mounted on the valve body and partitioning the interior of the shell into a constant pressure chamber and a variable pressure chamber;

a valve mechanism mounted in the valve body for supplying a fluid to or discharging a fluid from the variable pressure chamber, the valve mechanism having a vacuum valve seat formed on the valve body, an atmosphere valve seat formed on a valve plunger which is coupled to an input shaft for operating the valve mechanism and a valve element which can be seated upon the vacuum valve seat and the atmosphere valve seat;

the input shaft for operating the valve mechanism; and a solenoid for causing back-and-forth movement of a solenoid plunger which is slidably mounted in the valve body to operate the valve mechanism;

characterized by the provision of a tubular member slidably mounted on the valve body and having the vacuum valve seat formed thereon and having a pressure responsive area which is subject to a pressure in the variable pressure chamber and to a pressure in the constant pressure chamber, the pressure responsive area including a diaphragm having an outer periphery secured to the valve body and an inner periphery secured to the valve plunger;

wherein upon energization of the solenoid, the solenoid plunger urges the tubular member towards the valve element to switch the valve mechanism and the force with which the solenoid plunger urges the tubular member is balanced with a force acting on the pressure responsive area of the tubular member which results from a pressure differential between the variable pressure chamber and the constant pressure chamber, thereby delivering a brake output which depends on the urging force from the solenoid plunger.

* * * * *